United States Patent [19]

Miller et al.

[11] Patent Number: 4,687,573

[45] Date of Patent: Aug. 18, 1987

[54] SORBING APPARATUS

[75] Inventors: John D. Miller, Homer, N.Y.; Marcel G. Verrando, Ocala, Fla.

[73] Assignee: Pall Corporation, Glen Cove, N.Y.

[21] Appl. No.: 640,356

[22] Filed: Aug. 13, 1984

[51] Int. Cl.[4] .................. B01D 15/00; B01D 53/04
[52] U.S. Cl. .................... 210/143; 55/212; 55/387; 55/524; 210/266; 210/269; 210/284; 210/506
[58] Field of Search ............ 210/269, 275–279, 210/502.1, 504, 506, 510.1, 679, 284, 143, 266; 55/387, 389, 524, 212

[56] References Cited

U.S. PATENT DOCUMENTS

| | | |
|---|---|---|
| 3,025,233 | 3/1962 | Figert .................................. 210/504 |
| 3,225,518 | 12/1965 | Skarstrom et al. ..................... 55/33 |
| 3,237,379 | 3/1966 | Kant et al. ............................. 55/58 |
| 3,313,091 | 4/1967 | Berlin .................................... 55/58 |
| 3,455,458 | 7/1969 | Johnson .............................. 210/275 |
| 3,519,398 | 7/1970 | Roberts ................................ 23/281 |
| 3,594,984 | 7/1971 | Toyama et al. ......................... 55/33 |
| 3,659,399 | 5/1972 | Kauer, Jr. et al. ..................... 55/33 |
| 3,950,251 | 4/1976 | Hiller .................................. 210/282 |
| 4,060,913 | 12/1977 | Yoshida et al. ......................... 34/80 |
| 4,062,129 | 12/1977 | Yoshida et al. ....................... 432/40 |
| 4,165,972 | 8/1979 | Iles et al. ............................... 55/28 |
| 4,237,538 | 12/1980 | Le Dall ............................... 210/143 |
| 4,261,832 | 4/1981 | Schumacher et al. ........... 210/502.1 |
| 4,269,611 | 5/1981 | Anderberg ............................ 55/179 |
| 4,293,378 | 10/1981 | Klein ................................... 210/504 |
| 4,295,863 | 10/1981 | Lattuada ................................ 55/21 |
| 4,322,223 | 3/1982 | Christel, Jr. ............................. 55/18 |
| 4,341,539 | 7/1982 | Gidaspow et al. .................... 55/278 |
| 4,383,920 | 5/1983 | Muller et al. ......................... 210/284 |
| 4,400,305 | 8/1983 | Takeuchi et al. .................... 210/679 |
| 4,421,567 | 12/1983 | Kulprathipanja et al. ......... 210/679 |
| 4,431,456 | 2/1984 | Kulprathipanja ................... 210/679 |

Primary Examiner—Ivars Cintins
Attorney, Agent, or Firm—Leydig, Voit & Mayer

[57] ABSTRACT

The disclosure describes a sorbing apparatus including at least one chamber having first and second ports and defining a fluid flow path between the first and second ports. The chamber includes a bed of sorbent particles which are bound to one another by a polymeric binding agent that prevents movement of the particles with respect to one another. The apparatus further comprises a fluid controller which alternately directs a fluid having a first concentration of a component through the bed of sorbent particles wherein the bed sorbs the component from the fluid and directs a purging fluid through the bed of sorbent particles wherein the bed is regenerated.

12 Claims, 3 Drawing Figures

SORBING APPARATUS

TECHNICAL FIELD

The present invention relates to apparatus for removing one or more components from a fluid comprising a mixture of components. In particular, it relates to an apparatus which includes a sorbent material for sorbing one or more components from the fluid.

BACKGROUND ART

In a variety of commercial and industrial settings, it is necessary to remove one or more components from a fluid, i.e., a gas or a liquid, before the fluid can be used for a particular purpose. For example, before contaminated water can be drunk, any chemical contaminants must be removed. Likewise, before compressed air can be used, for example to drive power tools, any water or water vapor must be removed or the tools will rust.

Many types of devices are available to remove one or more components from a fluid. On particularly effective class of devices characteristically comprises an apparatus which directs a flow of the fluid through a sorbent material, i.e., a material which sorbs certain components. The sorbent material is typically in the form of a bed of sorbent particles which may be either loosely loaded or loaded under compression into a vertically oriented vessel. During a sorbing phase, the fluid containing the components is pumped at a certain pressure into either the top or the bottom of the vessel and then passed through the sorbent particle bed where the components are sorbed by the sorbent material. The fluid, now free of the components, is then removed from the other end of the vessel.

To extend the useful life of these sorbing apparatus, the sorbent bed is periodically regenerated, i.e., stripped or the components it has sorbed from the fluid. During a regenerating phase, the vessel is typically depressurized. Then, a heated and/or component-free fluid is flushed through the sorbent bed, purging the component from the sorbent particles. This purging fluid, now containing much of the components previously sorbed by the sorbent bed, is then exhausted. Once the sorbent bed is sufficiently free of the components, the vessel is repressurized and the fluid containing the components is again pumped through the vessel. The regenerated sorbent bed then continues sorbing the components from the fluid. The sorbing apparatus can continue cycling between the sorbing phase and the regenerating phase for an extended period.

As effective as these apparatus are, they nevertheless have several undesirable characteristics. For example, they frequently generate significant quantities of sorbent dust, i.e., small fragments of the sorbent particles. Sorbent dust, which is extremely abrasive, can flow with the fluid through the end of the vessel. To withstand the destructive effect of this abrasive dust, any downstream pipes and valves are typically made of a heavier gauge than would otherwise be necessary and/or are specially designed to accommodate the severe conditions. Such pipes and valves significantly increase the weight and cost of the apparatus. These sorbing apparatus typically include a sorbent dust filter downstream from the sorbent bed to prevent migration of the sorbent dust. While the sorbent dust filter may collect much of the dust, it nonetheless adds to the mechanical complexity of the apparatus. It also increases both maintenance and operational costs since the filter must be periodically cleaned or replaced.

Sorbent dust may be generated in a variety of ways. For example, sorbent particles as received from the manufacturer frequently include a significant amount of sorbent dust generated during the manufacturing process and during shipping. Further, when loading the sorbent particles into the vessel, the particles can abrade against one another, generating the dust. They can also abrade against one another whenever the sorbent bed is jarred, e.g., when the sorbing apparatus is transported, or when it must be mounted where it is subjected to vibration, e.g., on board a ship. Further, once loaded, the sorbent particles at the bottom of the bed bear the weight of the entire sorbent bed and may be crushed into sorbent dust by the load. To avoid fragmenting or crushing sorbent particles, these sorbing apparatus characteristically use extremely hard particles which significantly limits the type of sorbent that can be used.

Sorbent dust may also be generated if the sorbent bed becomes fluidized, i.e., if the particles of sorbent are moved by the fluid passing through the bed. The moving sorbent particles may collide with and/or abrade against one another, generating the dust. The avoid fluidization in the sorbing phase, available sorbing apparatus maintain the velocity of the fluid at a very low level which, for some applications, significantly limits the amount of fluid that can be processed in a given amount of time. To avoid fluidization during the regenerating phase, the sorbing apparatus typically not only maintain the velocity of the purging fluid at a very low level but also depressurize and repressurize the vessel relatively slowly. For a given cycle time, this significantly decreases the amount of time available for flushing the sorbent particles during the regenerating phase. Known sorbing apparatus also avoid fluidization by comprising the sorbent bend, e.g., by using spring-loaded mechanisms which bear against the top of the bed. Not only are these mechanisms frequently heavy and expensive but they further add to the load that the particles at the bottom of the bed must bear.

Another undesirable characteristic of known sorbing apparatus is that the sorbent bed, although initially loaded evenly, may develop channels since the sorbent particles may settle within the bed due to vibration or shock. These channels allow the fluid to bypass the sorbent particles and decrease the effectiveness of the sorbent bed in removing the components from the fluid. To minimize channelling, the vessels of known sorbing apparatus are generally oriented vertically. Vertical vessels, however, require supports, such as legs, to keep them upright. These supports, again, significantly increase both the weight and cost of the apparatus. Further, it is frequently desirable that these devices be portable. Since the center of gravity of a vertical vessel is much higher than that of a horizontal, the apparatus is more likely to tip over when moved.

DISCLOSURE OF THE INVENTION

The present invention provides an improved apparatus for sorbing one or more components from a fluid comprising a mixture of components. In accordance with the invention, the sorbing apparatus includes a sorbent bed comprised of immobilized sorbent particles, i.e., particles of sorbent material individually bound in a self-supporting structure. In the process of making the immobilized sorbent bed both the sorbent particles and any included sorbent dust are bound within the structure. Generation of sorbent dust within the immobilized bed is virtually precluded since the particles are not free to move in relation to one another, e.g., to collide with and/or abrade againt one another. Thus, downstream pipes and and valves may be fabricated of a much lighter gauge and/or designed for far less severe conditions, and the downstream sorbent dust filter may be eliminated.

Further, fluidization of the bed is also virtually precluded since the sorbent particles are each bound within the structure of the bed and are not free to move with the fluid. Thus, the bed can withstand much higher fluid velocities. This enables a significantly greater amount of fluid to be processed in a given amount of time or the same amount of fluid to be processed by a smaller bed. It also enables the bed to be depressurized and repressurized exception rapidly. Consequently, a much greater portion of the regeneration time may be spent flushing the sorbent bed as opposed to depressurizing or repressurizing the vessel. Further, since each particle is bound within the structure of the bed, a device for compressing the sorbent bed to prevent fluidization is not required.

The sorbent bed of the sorbing apparatus according to the present invention also virtually precludes settling of the particles and channelling in the bed. Again, since the sorbent particles are each bound within the structure of the bed, the particles do not settle when the bed is vibrated or jarred. Further, the vessel containing the sorbent bed may be oriented in any direction, including horizontally, without having the particles shift or settle. In addition, since the bed comprises a self-supporting mass, it may be more readily fashioned in an optimum geometry to provide better utilization of space and will better retain its geometry when it is transported or vibrated.

The present invention may, for example, be embodied by a sorbing apparatus comprising at least one chamber having an outer cylindrical shell and first and second ports and defining a fluid flow path between the first and second ports. The chamber includes a bed of sorbent particles which are bound to the shell and/or bound to one another by a polymeric binding agent that prevents movement of the particles with respect to one another. The apparatus further comprises a fluid controller which alternately directs the fluid having the first concentration of the component through the bed of sorbent particles wherein the bed sorbs the component from the fluid and then directs a purging fluid through the bed of sorbent particles wherein the bed is regenerated.

BEST MODE FOR CARRYING OUT THE INVENTION

Figure 1:
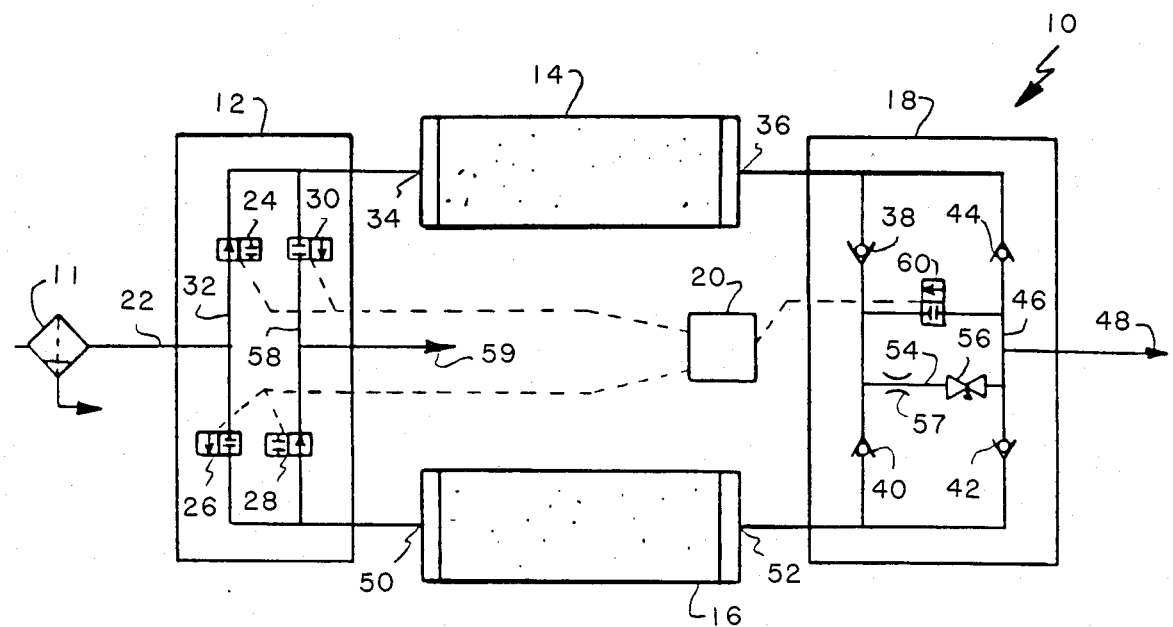
FIG. 1 is a block diagram of an exemplary sorbing apparatus embodying the present invention.

As shown in FIG. 1, an exemplary sorbing apparatus 10 embodying the present invention generally comprises a prefilter 11, an intake manifold-valve structure 12, first and second identical sorbing chambers 14, 16, an outlet manifold-valve structure 18, and a control system 20. The prefilter 11, the manifold-valve structures 12, 18 and the control system 20, as well as the general operational aspects of the sorbing apparatus 10, are well known in the art and are subject to many variations. For example, the control system 20 may comprise either an electronically or a pneumatically operated system, or the sorbing apparatus 10 may additionally include one or more heaters (not shown) operatively associated with the first and second sorbing chambers 14, 16. Further, the sorbing apparatus 20 may alternatively comprise only a single sorbing chamber or more than two sorbing chambers.

In the exemplary sorbing apparatus 10 of FIG. 1, an influent fluid containing one or more components, such as water vapor or a chemical contaminant, is first directed through the prefilter 11 which removes any solid particles and/or liquids from the fluid. The fluid is then directed by the intake manifold-valve structure 12 from an intake 22 into one of the two sorbing chambers 14, 16. For example, if the control system 20, which is coupled to each of four solenoid valves 24, 26, 28, 30 of the intake manifold-valve structure 12, opens the first and third valves 24, 28 and closes the second and fourth valves 26, 30, the influent fluid is directed from the intake 22 along an intake line 32 and into the first sorbing chamber 14 through a first port 34.

Both sorbing chambers 14, 16 contain a sorbent material or a mixture of sorbent materials capable of sorbing the component from the influent fluid. For example, if the influent fluid is wet air, the sorbing chambers 14, 16 may contain activated alumina or silica gel. Alternatively, if the influent fluid is water or air contaminated with chemical pollutants, the sorbing chambers 14, 16 may contain activated carbon or molecular sieve. The influent fluid enters the first port 34 of the first sorbing chamber 14 at a preselected pressure and passes through the sorbent material where the component is sorbed from the fluid. An effluent fluid containing none of, or at least a much lower concentration of, the component then exits the first sorbing chamber 14 through a second port 36. The effluent fluid is then directed by check valves 38, 40, 42, 44 of the outlet manifold-valve structure 18 from the first sorbing chamber 14 along an outlet line 46 to an outlet 48.

To regenerate the sorbent material in the first sorbing chamber 14, the control system 20, after a certain length of time, closes the first and third valves 24, 28 and opens the second and fourth valves 26, 30 of the intake manifold-valve structure 12. The influent fluid is then directed from the intake 22 along the intake line 32 and into the second sorbing chamber 16 through a first port 50 where the component in the influent fluid is sorbed by the sorbent material in the second sorbing chamber 16. The effluent fluid exits the second sorbing chamber 16 through a second port 52 and is directed by the check valves 38, 40 42, 44 of the outlet manifold-structure 18 along the outlet line 46 to the outlet 48.

A portion of the effluent fluid is used as a purge fluid and is passed along a purge line 54 through an adjustable purge valve 56 and an orifice 57 and through the second port 36 into the first sorbing chamber 14, which was depressurized when the fourth valve 30 was opened by the control system 20. The sorbent material in the first chamber 14, which was warmed by the heat of absorption when the influent fluid was being passed through the first sorbing chamber 14, desorbs the component into the purge fluid. An exhaust fluid having a high concentration of the component then exits the first sorbing chamber 14 through the first port 34 and is directed by the solenoid valves 24, 26, 28, 30 of the intake manifold-valve structure 12 along an exhaust line 58 to an exhaust 59.

Once the sorbent material in the first sorbing chamber 14 has been sufficiently regenrated, the control system 20 opens the first and third solenoid valves 24, 28, and closes the second and fourth solenoid valves 26, 30. This redirects the influent fluid through the first sorbing chamber 14 and a portion of the effluent fluid through the second sorbing chamber 16, which repressurizes the first sorbing chamber 14 and regenerates the sorbent material in the second sorbing chamber 16. The control system 20 may optionally be coupled to a repressurization valve 60. To quickly repressurize the first chamber 14, the control system 20 closes the fourth solenoid valve 30 and briefly opens the repressurization valve 60 before closing the second solenoid valve 26 or opening the first and third solenoid valves 24, 28. The control system 20 continues, for an extended period, this process of alternately sorbing the influent fluid in the first chamber 14 while regenerating the sorbent material in the second chamber 16 and then regenerating the sorbent material in the first chamber 14 while sorbing the influent fluid in the second chamber 16.

Figure 2:
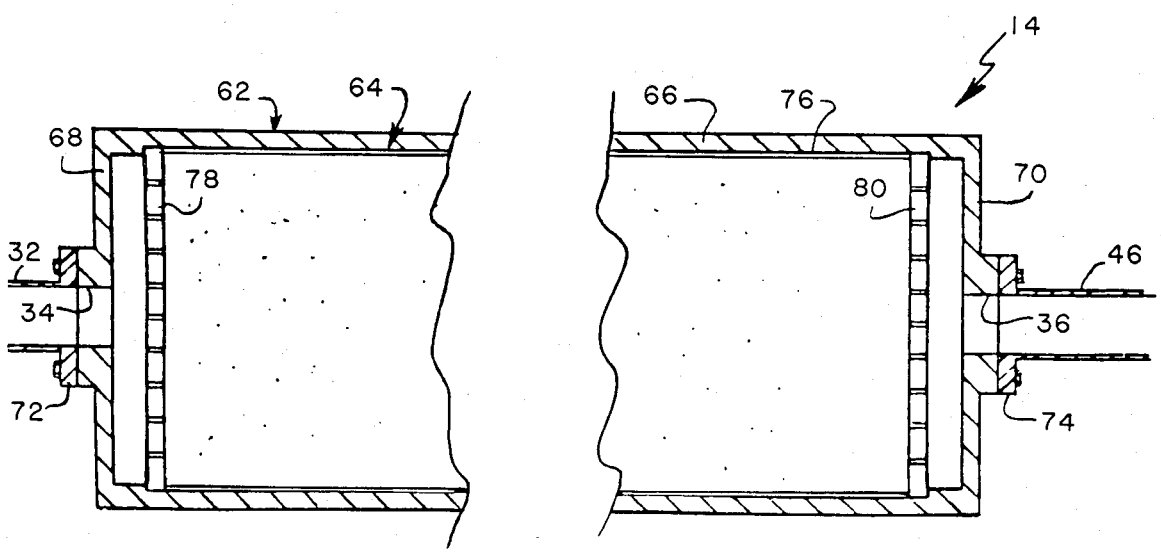
FIG. 2 is a sectional view of the sorbing chamber of the sorbing apparatus fo FIG. 1.

In accordance with one aspect of the invention, the sorbent material in each sorbing chamber 14, 16 is immobilized, i.e., the particles of sorbent material are bound in a self-supporting structure or bed. As shown in FIG. 2, each chamber 14, 16 of the exemplary sorbing apparatus 10, e.g., the first chamber 14, comprises a housing 62 containing the immobilized sorbent bed 64. While the housing may comprise any suitably configured container fabricated from a sufficiently rigid material, the housing 60 of the exemplary sorbing apparatus 10 is fashioned as a right circular cylinder from carbon steel. The housing 60 includes an outer shell 66 which is preferably fabricated from one-sixteenth inch to one-eighth inch or greater carbon steel, as required by a particular pressure rating, and first and second base plates 68, 70 which contain the first and second ports 34, 36, respectively. The first and second base plates 68, 70 are adapted to be bolted to flanges 72, 74 on the intake line 32 and the outlet line 46, respectively, allowing the sorbing chamber 14 to be easily replaced.

The immobilized sorbent bed 64 may be formed, for example, of inorganic sorbent particles which have been immobilized with a polymeric binding material. The inorganic sorbents which may be used may be any of a wide range of inorganic materials. Preferred are the inorganic oxides of aluminum, silicon and magnesium, such as alumina, silica, magnesia, molecular sieves, zeolites, silica gel, and activated alumina. These material are generally produced by thermal cycling of gels of the particular inorganic oxide.

In general, when an inorganic oxide is used as the sorbent, it is preferred the the sorbent have particle sizes in the range from about 1 to about 10 millimeters. With proper classification of the sorbent, the major portion thereof will generally constitute from about 95 to about 99.5 percent of the material. Most preferably, the average particle size of the inorganic sorbent particles will be in the range of from about 2 to about 5 millimeters.

A preferred process for immobilizing inorganic sorbent particles and forming a self-supporting structure thereform comprises the steps of:

(a) preheating the inorganic sorbent particles, (b) mixing the heated sorbent particles with a powdered polymeric binding material, the sorbent particles comprising from about 1 to about 7 weight percent, preferably from 2 to 5 weight percent, based on the total weight of the mixture, wherein a major portion of the polymeric binding material has particle sizes in the range of from about 8 to about 100 micrometers, to form a mixture comprising particles of polymeric binding material adhered to the sorbent particles, and (c) applying a pressure ranging up to about 100 psi, preferably from about 0.3 to about 50 psi, while the temperature of the mixture is approximately at the solid-liquid transition temperature of the polymeric binding material, resulting, when the polymeric binding material is cooled, in a self-supporting structure in which the sorgent particles are immobilized and their sorbent properties have been retained.

The mixing and application of pressure may be done in a mold of a desired shape and the resulting immobilized bed 64 will then assume the shape of the mold. Conveniently, the mold may comprise the outer shell 66 of the housing 60.

The preferred self-supporting sorbent structures prepared from inorganic sorbent particles and a polymeric binding agent preferably have a major portion of the inorganic sorbent particles with particle sizes in the range of from about 1 to about 10 millimeters, the preferred shape of the particles being spherical, and the structure preferably comprises from about 1 to about 7 percent by weight of the polymeric binding material, the percentage based on the total weight of the mixture of polymeric binding material in the sorbent particles and the balance being the inorganic sorbent material.

The "solid-liquid transition stage" referred to above with regard to the process for forming the self-supporting structure refers to the temperature at which the polymeric binding material is softened to the extent that no well defined particles exist which have the physical attributes of a solid, yet the material does not flow as does a liquid. This temperature or stage, termed herein the "solid-liquid transition stage", is generally about 50 to about 90 degrees Fahrenheit above the Vicat softening point. At this point, the polymeric binding material which existed at a lower temperature as separate particles, merge to form a unitary matrix with an increased tackiness. This tackiness, probably resulting from increased mobility of the molecular chains of the molecules, provides improved interparticle adhesion.

The solid-liquid transition stage is not to be confused with the melting point in which solid and liquid phases exist in dynamic equilibrium with one another. At the solid-liquid transition stage, the polymeric binding material may be thought to be in a hybrid state between solid and liquid states. When the polymeric binding material is at this stage, the mixture of thermoplastic material and sorbent particles may be compressed sufficiently by application of pressure to decrease the distance between the sorbent particles or increase the number of contact points between adjacent particles and increase interparticle bonding, providing thereby increased compressive strength with retention of adsorptive properties.

The solid-liquid transition stage for a polymeric binding material is not as sharply defined as is the melting point of a pure crystalline material and, in some instances, the temperature range of this stage is somewhat broad. However, it is, in general, undesirable to use temperatures in preparing immobilizing sorbents for use in the present invention much above the temperature of the solid-liquid transition since the polymeric binding material then exhibits the characteristics of a liquid in that it tends to readily flow. This is to be avoided since blinding of the pores of the sorbent may occur and formation of a mass or block of coated sorbent particles in which the adsorption characteristics have been reduced or lost may result.

Alternatively, the immobilized bed 64 may be formed from a self-supporting structure in which adsorbent carbon particles, including carbon fines, are immobilized in a polymeric binding agent. One preferred method for forming such self-supporting structures comprises the steps of:

(a) mixing carbon particles, a major portion of which has particle sizes in the range of from about 200 to about 2,000 microns, with a polymeric binding material in an amount of from about 5 to about 20 percent by weight, based on the total weight of the mixture, a major portion of the polymeric binding material having particles sizes in the range of from about 8 to about 30 microns, thereby forming a mixture of the carbon particles coated with the polymeric binding material, (b) placing the mixture in a container of a desired shape, e.g., the outer shell 66 of the housing 60, and (c) applying a pressure of up to about 400 psi while the mixture is at a temperature corresponding to the solid-liquid transition stage, resulting, when the polymeric binding material is cooled, in the self-supporting structure in which the adsorbent carbon particles are immobilized.

The resulting carbon-containing, self-supporting structure combines a relatively low pressure drop and high compressive strength and comprises adsorbent carbon particles, a major portion of which have particle sizes in the range of from about 200 to about 2,000 microns, about 0.5 to about 5 percent by weight, based on the weight of the absorbent particles, carbon fines having particle sizes in the range of from about 0.1 to about 50 microns, and about 5 to about 20 percent by weight of a polymeric binding material, the percentages based on the total weight of the mixture of polymeric binding material, carbon particles and any carbon fines present.

Any form of adsorbent carbon is suitable but activated carbon is preferred. By "activated carbon" is generally meant a form of carbon which is characterized by very high adsorptive capacity for gases and is generally produced by the destructive distillation of various carbon-containing materials. The carbonaceous material is subsequently activated at an elevated temperature with steam or carbon dioxide, which brings about the porous nature of the carbon. A preferred form of carbon is an activated carbon available from Calgon Corporation, a subsidiary of Merck and Company, designated a BPL 12×30 mesh and having an average particle size of about 1,200 microns.

Prior to mixing of the thermoplastic material, the adsorbent carbon particles may be treated with metal compounds or metal complexes, such as copper, chromium and silver compounds, and complexes of such materials with compounds, such as ammonia, in any conventional way, as, for example, by a process known as "Whetlerizing". Examples of such compounds are disclosed, for example, in U.S. Pat. Nos. 2,920,050 and 2,920,051 which are incorporated herein by reference.

The polymeric binding material referred to herein as useful for immobilizing the sorbent material, e.g., both carbon and inorganic sorbents such as alumina, silica, magnesia, etcetera as referred to above, may be either a thermoplastic or a thermosetting polymeric material, preferably synthetic, which is capable of being shaped under the process conditions used in preparing the immobilized sorbent structures used in the present invention.

The term "thermoplastic material" describes the preferred polymeric binding material used in the present invention and generally refers to any polymeric material having thermoplastic properties. It may include any synthetic or semi-synthetic condensation or polymerization product. Preferably, the thermoplastic material is a homopolymer or copolymer of a polyolefin. Most preferable are polyethylene and polypropylene, the former being particularly preferred.

Other thermoplastic materials include polystyrene, polycarbonates, polyurethanes, phenoxy resins, vinyl resins derived from monomers such as vinyl chloride, vinyl acetate, vinylidene chloride, etcetera, including polyvinyl chloride, copolymers of vinyl chloride with one or more of acrylonitrile, methacrylonitrile, vinylidine chloride, alkyl acrylate, alklyl methacrylate, alkly maleate, alkyl fumarate, etcetera.

In some instances, to provide creep resistance, a thermosetting material may be preferred as the polymeric binding agent. Suitable for this use are the type of cross-linked polyethylenes used as cable coatings, such as materials formed from blends of polyethylene with peroxide cross-linking agents, such as, for example, benzoyl or dicumyl peroxide, present in catalytic amounts. Other examples include those materials in which a prepolymer is reacted with a cross-linking agent to form the product and includes polyurethanes of the type in which a "blocked" diisocyanate is reacted initially with a difunctional compound, such as a diol, to form the prepolymer which, in turn, is reacted with a trifunctional compound, such a a triol, to form, at the appropriate temperature, a cross-linked polymer. These thermosetting materials, which generally cross-link at temperatures between 100 to 200 degrees Centrigrade, exhibit properties similar to the preferred crystalline thermoplastic materials discussed below.

The selection of a polymeric binding material depends to some extent on the properties sought in the self-supporting structure which is formed in part from the binding material. That is, some of the mechanical properties of the immobilized structure are determined by the physical properties of the binding material. If, for instance, a structure which flexes or which resists fracturing is desired, a thermoplastic powder should be used which is not fully crystalline or below its glass transition temperature at the temperature at which the article is used. Conversely, a rigid structure requires more crystalline thermoplastic or thermosetting material.

A requirement of any material selected as the polymeric binding material for use in the present invention is that it have a sufficiently high viscosity at the processing temperature so as to not flow and "blind" or reduce the porosity of the sorbent material, which porosity is necessary for effective adsorption. In the heating step as described above, the polymeric binding material should begin to soften so that the particles lose their original shape and become slightly tacky. However, the material should not have a viscosity at the processing temperature such that it flows and results in blinding.

When thermoplastic materials are used in the present invention, particularly preferred are the polyethylene powders known commercially as Microthene FN 500, FN 510 and FN 524, available from USI Chemicals. These powdered polyethylene powders differ somewhat from one another in density and Vicat softening point. When a somewhat more flexible structure is desired, up to 10 percent of a second ethylenically unsaturated material, such as vinyl acetate, may be copolymerized with the ethylene to provide an amorphous thermoplastic binding material. A copolymer of this type exhibits less of a tendency to blind and also imparts some energy or shock absorbency properties to the immobilized structure, thereby reducing the tendency of the structure to fracture when handled with less caution than that required by structures using more crystalline homopolymers. A suitable material of this type comprises 9 percent by weight vinyl acetate copolymerized with polyethylene as available from USI Chemicals as Microthene FN 532.

Where the outer shell 66 has served as the mold in forming the immobilized sorbent bed 64, the polymeric binding agent, when heated, not only binds the sorbent particles together but also binds the bed 64 to the shell 66, preventing bypass or channeling around the edge of the bed 64 when fluid flows through the chamber 14. Alternatively, where the outer shell 66 has not served as the mold, the immobilized sorbent bed 64 further includes an impervious outer casing 76 which prevents fluid flowing through the bed 64 from migrating beyond the edge of the bed 64. In either case, the chamber 14 further includes first and second perforated spaced plates 78, 80 disposed between the immobilized sorbent bed 64 and the first and second base plates 68, 70, respectively, to aid in supporting the bed 64 and maintaining the bed 64 in position.

One highly advantageous operational aspect of a sorbing apparatus 10 according to the present invention is that it virtually precludes fluidization of the sorbent bed 64 and the consequent attrition and formation of abrasive sorbent dust generated in a fluidized bed. Since each sorbent particle is individually bound in the self-supporting mass of the bed 64, none of the particles are free to move with the fluid as the fluid flows through the chamber 14. Since fluidization is not a design constraint of the present invention, smaller sorbent particles can be used to fashion the immobilized sorbent bed than were used in the prior art systems. These smaller particles are capable of sorbing far more of a particular component for a given weight of sorbent material, i.e., provide a superior mass transfer rate. Consequently, less weight of sorbent material need be used for any given application.

Another advantage of eliminating fluidization as a design constraint is that flow rates through the sorbing chambers 14, 15 can be much greater than in prior art systems. This not only allows a greater volume of fluid to be processed in a given amount of time, but also permits a faster cycle time for the sorbing apparatus 10. For example, the NEMA cycle time for the sorbing apparatus 10 may be in the range from about 5 seconds to about 10 minutes with the preferred range depending on the parameters of a particular application. Depressurization and repressurization of each chamber during each cycle can occur much more quickly because the high fluid velocities which accompany rapid changes in pressure will not fluidize the immobilized bed 64.

Another major advantage of the sorbing apparatus 10 according to the present invention is that with the elimination of the abrasive sorbent dust the components designed to protect the system from the abrasive sorbent dust may also be eliminated. For example, stainless steel screens and other filters which are designed to contain the sorbent dust within the chambers are not required. Further, since the lines and valves which handle fluids flowing from the chambers are not subject to the corrosive and abrasive effects of the sorbent dust, they can be made of a lighter gauge and need not be specially protected. Consequently, they are far less heavy and expensive than those of the prior art systems. The absence of sorbent dust also generally enhances the longevity and reliability of the remainder of the system downstream from the sorbing apparatus 20.

Figure 3:
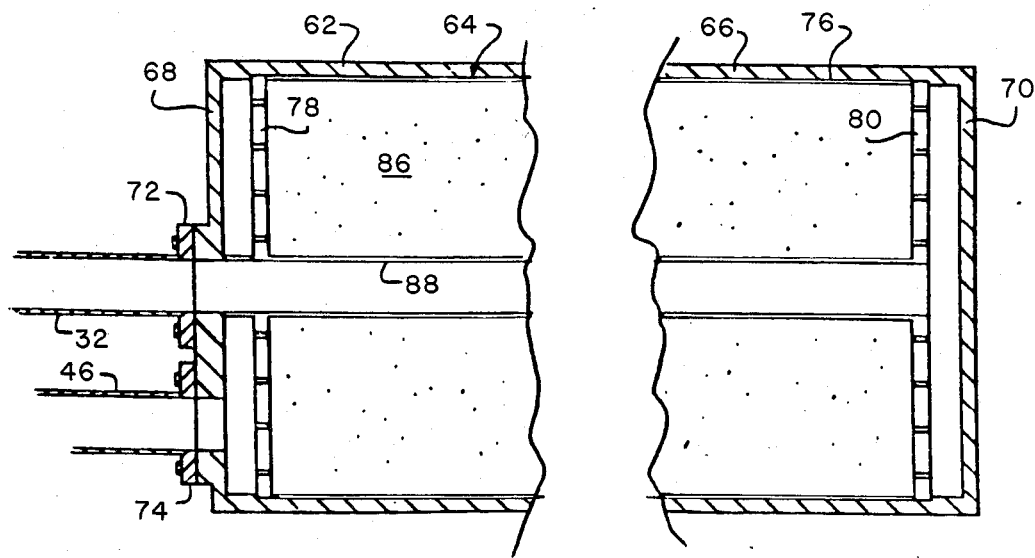
FIG. 3 is a sectional view of an alternative sorbing chamber of the sorbing apparatus of FIG. 1.

The immobilized sorbent bed 64 may be variously configured without departing from the scope of the invention. For example, it may be configured as a right circular cylinder, as shown in FIG. 2. The diameter of the cylinder determines the flow area and therefore the pressure drop for a given application. Typical diameters are in the range of about ½ inch to about 24 inches, and typical lengths are in the range from about 1 to about 4 times the diameter. The immobilized sorbent bed may also be configured as an annular structure 86 with a central core 88 which serves as an extension of the intake line 32, as shown in FIG. 3. The configuration of FIG. 3 is particularly advantageous in that it allows the intake line 32 and the outlet line 46 to be connected to the same side of the chamber. Further, if a cylindrical immobilized sorbent structure is also placed in the core 88, the overall length of the chamber 14 may be reduced.

Since the sorbent bed 64 is immobilized, the sorbing chambers 14, 16 may be oriented in any direction, including horizontally, without having the sorbent particles settle to create channels in the bed 64 and allow the influent fluid to bypass the sorbent material. This resistance to settling and channeling also permits utilization of the sorbing apparatus 10 in environments marked by excess vibration, such as aboard ship.

The sorbing apparatus 10 according to the present invention may be used for a variety of applications including, as a purifier, to remove chemical contaminants from air or water and, as a dryer, to remove water or water vapor from air. From example, as a dryer, the sorbing apparatus 10 may accommodate flow rates from about 1 scfm to about 1,000 scfm but has particular applicability to flow rates of about 400 scfm or less. Thus, a flow rate of 40 scfm of 100 psig wet influent air saturated at 100 degrees Fahrenheit will yield 34 scfm of 100 psig effluent air with a dew point of minus 100 degrees Fahrenheit. Six scfm will be reduced to zero psig and used as purge gas to regenerate one of the immobilized sorbent beds during each cycle.

Although the present invention has been described in terms of one or more particular embodiments, it is not limited to these embodiments. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as defined by the claims.

We claim:

1. A sorbing apparatus for removing at least a portion of a component from a fluid having a first concentration of the component, said apparatus comprising at least one chamber having first and second ports and defining a fluid flow path between the first and second ports, the chamber including a bed of sorbent particles disposed in the fluid flow path, said sorbent particles including particles of carbon and being bound to one another by a polymeric binding agent wherein relative movement of the particles is prevented, and fluid control means for alternately directing the fluid having the first concentration of the component through the bed of sorbent particles wherein the bed of sorbent particles sorbs the component from the fluid and directing a purging fluid through the bed of sorbent particles wherein the bed of sorbent particles in regenerated.

2. The sorbing apparatus of claim 1 wherein the carbon particles have a size in the range of from about 0.1 micron to about 2,000 microns.

3. A sorbing apparatus for removing at least a portion of of a component from a fluid having a first concentration of the component, said apparatus comprising at least one chamber including an outer cylindrical shell and first and second ports and defining a fluid flow path between the first and second ports, the chamber further including a bed of sorbent particles bound to the shell and disposed in the fluid flow path, said sorbent particles being bound to one another by a polymeric binding agent wherein relative movement of the particles is prevented, and fluid control means for alternately directing the fluid having the first concentration of the component through the bed of sorbent particles wherein the bed of sorbent particles sorbs the component from the fluid and directing a purging fluid through the bed of sorbent particles wherein the bed of sorbent particles is regenerated.

4. A sorbing apparatus for removing at least a portion of of a component from a fluid having a first concentration of the component, said apparatus comprising at least one chamber having an outer cylindrical shell and first and second ports and defining a fluid flow path between the first and second ports, the chamber including a cylindrically configured bed of sorbent particles disposed within the cylindrical shell in the fluid flow path, said sorbent bed including an impervious outer casing and said sorbent particles being bound to one another by a polymeric binding agent wherein relative movement of the particles is prevented, and fluid control means for alternately directing the fluid having the first concentration of the component through the bed of sorbent particles wherein the bed of sorbent particles sorbs the component from the fluid and directing a purging fluid through the bed of sorbent particles wherein the bed of sorbent particles is regenerated.

5. A sorbing apparatus for removing at least a portion of a component from a fluid comprising a mixture of components, said sorbing apparatus comprising an intake; an outlet; an exhaust; first and second sorbing regions, each having first and second ports and defining flow path therebetween and each including a bed of sorbent particles disposed in the fluid flow path, said sorbent particles being bound to one another by a binding agent; first valve means for interconnecting the intake, exhaust, and the first ports of the first and second sorbing regions; second valve means for interconnecting the outlet and the second ports of the first and second sorbing regions; and control means coupled to at least the first valve means for alternately first directing fluid from the intake through the first sorbing region to the outlet while channeling a portion of the outlet fluid through the second sorbing region to the exhaust and directing fluid from the intake through the second sorbing region to the outlet while channeling a portion of the outlet fluid through the first sorbing chamber to the exhaust whereby the sorbent bed in each sorbing region alternately sorbs the component from the intake fluid and is regenerated by the outlet fluid.

6. The sorbing apparatus of claim 5 wherein the first and second sorbing regions each comprise cylindrically configured sorbing chambers including an outer cylindrical shell and a cylindrically configured sorbent bed disposed within the shell.

7. The sorbing apparatus of claim 6 wherein the sorbent particles are bound to one another by a polymeric binding agent which further binds the sorbent bed to the cylindrical shell.

8. The sorbing apparatus of claim 6 further comprising an impervious casing attached to and extending axially along the periphery of the sorbent bed.

9. The sorbing apparatus of claim 6 wherein the first and second ports are disposed on opposite ends of the sorbing chambers.

10. The sorbing apparatus of claim 6 wherein the axes of the cylindrical sorbing chambers are oriented at an angle away from vertical.

11. The sorbing apparatus of claim 5 wherein each sorbing region sorbs at a first pressure and is regenerated at a second lower pressure and wherein the second valve means includes means coupled to the control means for increasing the portion of outlet fluid being directed into a sorbing region whereby the sorbing region may be more quickly represssurized once it is isolated from the exhaust.

12. A system for removing one or more constituents from a fluid comprising mixture of components and particulates, said system comprising an intake; and outlet; an exhaust; prefilter means disposed in the intake for removing the particulates; first and second cylindrical sorbing chambers, each including a cylindrically configured sorbent bed, an impervious fluid barrier extending axially along the periphery of the sorbent bed, and first and second ports respectively communicating with the ends of the sorbent bed, said sorbent bed comprising a plurality of sorbent particles bound to one another by a polymeric binding agent; a first valve assembly disposed downstream from the prefilter means and interconnecting the intake, the exhaust and the first ports of the first and second sorbing chambers; a second valve assembly interconnecting the outlet and the second ports of the first and second sorbing chambers; and a fluid control means coupled at least to the first valve assembly for simultaneously directing prefiltered intake fluid through one sorbing chamber to the outlet and a portion of the outlet fluid through the other sorbing chamber to the exhaust.

* * * * *